(12) United States Patent
Hogan et al.

(10) Patent No.: US 8,399,550 B2
(45) Date of Patent: Mar. 19, 2013

(54) TREAD COMPOSITIONS WITH IMPROVED DYNAMIC STORAGE MODULUS

(75) Inventors: Terrence E. Hogan, Akron, OH (US); Christopher G. Robertson, Akron, OH (US); Alberto Scurati, Milan (IT)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/283,812

(22) Filed: Oct. 28, 2011

(65) Prior Publication Data

US 2012/0046410 A1 Feb. 23, 2012

Related U.S. Application Data

(63) Continuation of application No. 12/260,393, filed on Oct. 29, 2008, now Pat. No. 8,071,671, which is a continuation of application No. 11/406,796, filed on Apr. 19, 2006, now abandoned.

(51) Int. Cl.
*C07C 323/12* (2006.01)
*C08G 73/10* (2006.01)
*C08K 5/06* (2006.01)
*B60C 1/00* (2006.01)
*B60C 3/04* (2006.01)

(52) U.S. Cl. ........ 524/368; 524/376; 524/377; 524/492; 524/493; 524/495; 524/496; 524/494

(58) Field of Classification Search .................. 524/494, 524/368, 376, 377, 492, 493, 495, 496
See application file for complete search history.

(56) References Cited

U.S. PATENT DOCUMENTS

| | | | |
|---|---|---|---|
| 5,430,087 A | 7/1995 | Carlson et al. | |
| 5,798,405 A | 8/1998 | Zimmer et al. | |
| 6,399,692 B2 * | 6/2002 | Hogan et al. | 524/494 |
| 6,630,535 B1 | 10/2003 | Hogan et al. | |
| 7,165,584 B2 | 1/2007 | Lin et al. | |
| 7,230,050 B2 | 6/2007 | Robertson et al. | |
| 7,504,457 B2 | 3/2009 | Hogan et al. | |
| 7,534,839 B2 | 5/2009 | Lawson et al. | |
| 2006/0086450 A1 | 4/2006 | Hogan et al. | |
| 2006/0178467 A1 | 8/2006 | Fukushima et al. | |

* cited by examiner

*Primary Examiner* — William Cheung
(74) *Attorney, Agent, or Firm* — Meredith E. Hooker; Arthur M. Reginelli

(57) ABSTRACT

A process for forming a tire component, the process comprising the steps of introducing a vulcanizable polymer, a curative, a first carbon black characterized by an iodine adsorption number, per ASTM D1510, that is greater than 60 g/kg, and a second carbon black characterized by an iodine adsorption number, per ASTM D1510, that is less than 60 g/kg to form a vulcanizable composition, fabricating a tire component from the vulcanizable composition, and curing the tire component.

11 Claims, 1 Drawing Sheet

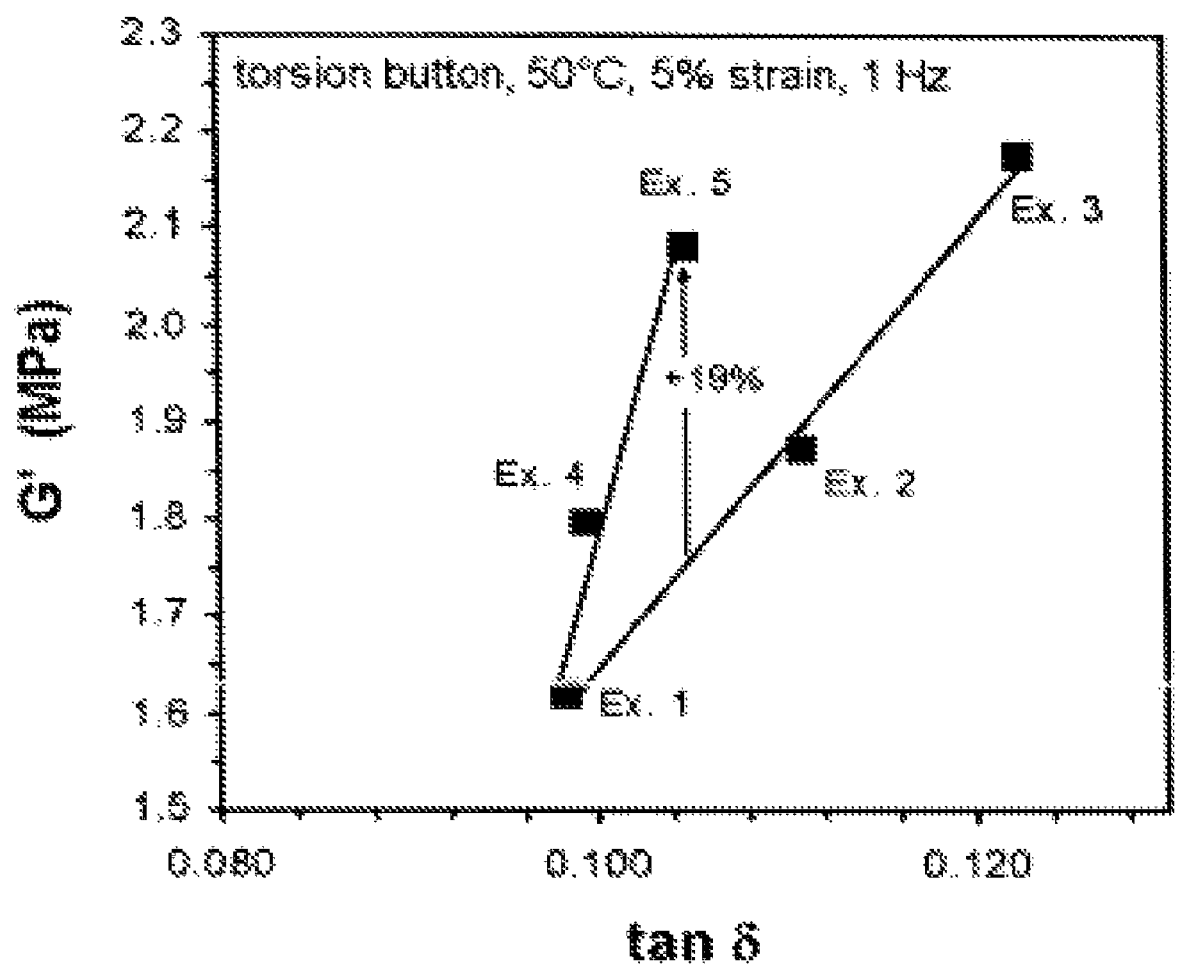

TREAD COMPOSITIONS WITH IMPROVED DYNAMIC STORAGE MODULUS

This application is a Continuation Application of U.S. Non-Provisional application Ser. No. 12/260,393, filed Oct. 29, 2008 now U.S. Pat. No. 8,071,671, which is a Continuation Application of U.S. Non-Provisional patent application Ser. No. 11/406,796, filed Apr. 19, 2006, now abandoned which is incorporated herein by reference.

FIELD OF THE INVENTION

One or more embodiments of the present invention are directed toward tire components and/or tire compositions, including treads, with improved dynamic storage modulus.

BACKGROUND OF THE INVENTION

Hysteresis loss, particularly at operating temperatures such as 50° C., is often attributed to rolling resistance. As a result, rolling resistance can be decreased by decreasing hysteresis loss (i.e., tan δ) at operating temperatures.

Functional polymers have successfully been employed to reduce rolling resistance. It is believed that certain functional groups, when attached to polymer chain ends, can serve to reduce free ends and/or reduce filler agglomeration, which are believed to be sources of hysteresis loss.

While functionalized polymers can be used to reduce hysteresis loss, there is also a desire to increase dynamic storage modulus, which often correlates to vulcanizate stiffness. While vulcanizate stiffness can be increased by employing larger amounts of filler materials, the increase in dynamic storage modulus often coincides with a large increase in hysteresis loss.

There is therefore a desire to increase dynamic storage modulus while minimizing the corresponding increase in hysteresis loss. In other words, it would be advantageous to increase dynamic storage modulus without observing any (or even a proportional) increase in hysteresis loss.

SUMMARY OF THE INVENTION

One or more embodiments of the present invention provide process for forming a tire component, the process comprising the steps of introducing a vulcanizable polymer, a curative, a first carbon black characterized by an iodine adsorption number, per ASTM D1510, that is greater than 60 g/kg, and a second carbon black characterized by an iodine adsorption number, per ASTM D1510, that is less than 60 g/kg to form a vulcanizable composition, fabricating a tire component from the vulcanizable composition, and curing the tire component.

Process for forming a tire component, the process comprising the steps of introducing a vulcanizable polymer, a curative, a first carbon black selected from ASTM N-300 series or lower carbon blacks, and a second carbon black selected from ASTM N-400 series or higher carbon blacks, where the ASTM designation is accorded by ASTM D1765, to form a vulcanizable composition, fabricating a tire component from the vulcanizable composition, and curing the tire component.

DETAILED DESCRIPTION OF THE DRAWINGS

The FIGURE includes a plot of G' versus tan δ for samples prepared according to the present invention as compared to comparative samples.

DETAILED DESCRIPTION OF ILLUSTRATIVE EMBODIMENTS

Tire components of one or more embodiments of the present invention include rubber vulcanizates having dispersed therein a carbon black filler, where the carbon black filler includes at least two distinct carbon blacks. In one or more embodiments, the first carbon black may be generally characterized by a medium or small particle size, and the second carbon black may be generally characterized by a larger particle size. In one or more embodiments, the rubber vulcanizates are prepared from functionalized polymers, and therefore the vulcanizates include one or more functional groups. In certain embodiments, the tire components include tire treads characterized by advantageous G' and tan δ.

In one or more embodiments, rubber vulcanizates including one or more functional groups can be prepared by vulcanizing an unsaturated polymer including a functional group. In one or more embodiments, the unsaturated polymer may be characterized by a glass transition temperature ($T_g$) that is less than about 0° C., in other embodiments less than about −20° C., and in other embodiments less than about 30° C.

Exemplary unsaturated polymers include polybutadiene, polyisoprene, poly(styrene-co-butadiene), poly(styrene-co-butadiene-co-isoprene), poly(isoprene-co-styrene), and poly(butadiene-co-isoprene).

In one or more embodiments, the unsaturated polymer may have a number average molecular weight ($M_n$) of from about 5 to about 1,000 kg/mole, in other embodiments from about 50 to about 500 kg/mole, and in other embodiments 100 to about 300 kg/mole. In these or other embodiments, the unsaturated polymer may also be characterized by a weight average molecular weight ($M_w$) of from about 5 to about 3,000 kg/mole, in other embodiments from about 50 to about 2,000 kg/mole, and in other embodiments 100 to about 1,200 kg/mole. Molecular weight may be determined using Gel Permeation Chromatography (GPC) calibrated with polystyrene standards and adjusted for the Mark-Houwink constants for the polymer in question.

The functional group may be tethered or attached to the polymer at the head and/or tail of the polymer, and in certain embodiments may be pendant to the polymer chain. Functional polymers may include multiple functional groups including head and tail functionalization. As those skilled in the art appreciate, head functionalization refers to the presence of a functional group at or near the location of initiation of the polymer, and tail functionalization refers to the presence of a functional group at or near the location of termination of the polymer.

In one or more embodiments, functional groups include those substituents that reduce the 50° C. hysteresis loss of a carbon black-filled vulcanizates as compared to similar carbon black-filled vulcanizates without the functional group. In one or more embodiments, this reduction in hysteresis loss is at least 5%, in other embodiments at least 10%, and in other embodiments at least 15%. In one or more embodiments, the functional groups include a hetero atom. These hetero atom-bearing substituents include those that may generally be characterized as an electron rich species or metal-containing species. Functional groups include those substituents that react or interact with rubber or rubber fillers or otherwise have a desirable impact on filled rubber compositions or vulcanizates.

Numerous functional groups are known in the art. Exemplary functional groups include tin-containing groups, nitrogen-containing groups, boron-containing groups, oxygen-containing groups, phosphorous-containing groups, and sulfur-containing groups. Exemplary tin-containing groups include trialkyltin groups such as tributyl tin and trioctyltin groups. Exemplary nitrogen-containing groups include cyclic amine groups such as hexamethyleneimine groups, pyrollidine groups, and aziridine groups. Exemplary sulfur-containing groups include sulfur-containing azaheterocycle groups, and dithiane groups. Exemplary oxygen-containing groups include carbonyl-containing groups, oxygen-containing and azaheterocycle.

Exemplary phosphorous-containing functionalized polymers are disclosed in U.S. Pat. No. 4,485,833; exemplary oxygen-containing azaheterocycle functionalized polymers are disclosed in U.S. Pat. No. 6,596,798; exemplary oxygen-containing and sulfur-containing heterocycle functionalized polymers are disclosed in International Publication Nos. WO 2004/020475; exemplary trialkyl tin substituent functionalized polymers are disclosed in U.S. Pat. No. 5,268,439; exemplary cyclic amine functionalized polymers are disclosed in U.S. Pat. No. 6,080,853; exemplary aryl or alkyl thio acetal (e.g., dithianes) functionalized polymers are disclosed in International Publication No. WO 2004/041870, all of which are incorporated herein by reference.

In one or more embodiments, the functionalized polymers may be prepared by initiating the anionic polymerization of conjugated diene monomer (optionally together with vinyl aromatic monomer) with an initiator bearing one or more functional groups (i.e., a functional initiator). In these or other embodiments, the functionalized polymer may be prepared by terminating living polymers, prepared from conjugated diene monomers optionally together with vinyl aromatic monomer, with a terminating agent bearing one or more functional groups (i.e., a functional terminator). In one or more embodiments, both a functional initiator and a functional terminator may be employed. Many functional initiators and functional terminators are known in the art. Exemplary functional initiators are disclosed in U.S. Pat. Nos. 5,332,810, 5,329,005, 5,578,542, 5,393,721, 5,698,646, 5,491,230, 5,521,309, 5,496,940, 5,574,109, 5,786,441, U.S. Patent Application Nos. 60/683,231, 60/683,152, and 10/533,408, and International Publication Nos. WO 2004/020475 and WO 2004/041870, which are incorporated herein by reference. Exemplary functional terminators are disclosed in U.S. Pat. Nos. 3,109,871, 3,135,716, 5,332,810, 5,109,907, 5,210,145, 5,227,431, 5,329,005, 5,935,893, 4,519,431, 4,540,744, 4,603,722, 5,248,722, 5,349,024, 5,502,129, 5,877,336, 786,441, 5,916,976, 5,552,473, 5,786,441, 5,916,976, 5,552,473, 4,677,165, 5,219,942, 5,902,856, 4,616,069, 4,929,679, 5,115,035, 6,359,167, 6,596,798, International Publication No. WO 2004/020475, and U.S. Ser. Nos. 60/644,164, 60/591,065, 60/622,188, 60/624,347 and 60/643,653, which are incorporated herein by reference.

The carbon black filler includes at least two distinct carbon blacks. At least one carbon black may be referred to as a first carbon black, and at least one other carbon black may be referred to as a second carbon black. In these or other embodiments, the first carbon black may be referred to as a medium or small particle size carbon black, and the second carbon black may be referred to as a large particle size carbon black.

In one or more embodiments, the first carbon black may be defined by an iodine absorption number that is greater than 60 g/kg, in other embodiments greater than 70 g/kg, in other embodiments greater than 80 g/kg, and in other embodiments greater than 90 g/kg, as determined according to ASTM D1510. In these or other embodiments, the first carbon black may be defined by an iodine absorption number that is less than 200 g/kg, in other embodiments less than 175 g/kg, and in other embodiments greater than 161 g/kg, as determined according to ASTM D1510. The first carbon black may also be characterized by a dibutylphthalate absorption number, as determined according to ASTM D2414, that varies over a wide range. For example, the dibutylphthalate absorption number may be as low as 70 $^{cc}/100$ g and increase up to numbers such as 154 $^{cc}/100$ g. In certain embodiments, the dibutylphthalate absorption number for the first carbon black, as determined by ASTM D2414, may be in excess of 115 $^{cc}/100$ g. In certain embodiments, the first carbon black may be defined by an iodine absorption number that is greater than 60 g/kg, but less than 110 g/kg, in other embodiments less than 105 g/kg, and in other embodiments less than 100 g/kg, as determined according to ASTM D1510.

In one or more embodiments, the first carbon black may be characterized as an N-300 series or lower carbon black according to ASTM D1765. These carbon blacks may include N-100 series, N-200 series, and N-300 series carbon blacks. Exemplary N-100 series carbon blacks include N-110 (which a skilled person recognizes has a statistical thickness surface area (STSA) value of 115 $m^2/g$), N-115 (which a skilled person recognizes has an STSA value of 124 $m^2/g$), N-120 (which a skilled person recognizes has an STSA value of 113 $m^2/g$), N-121 (which a skilled person recognizes has an STSA value of 114 $m^2/g$), N-125 (which a skilled person recognizes has an STSA value of 121 $m^2/g$), N-134 (which a skilled person recognizes has an STSA value of 137 $m^2/g$), and N-135 carbon blacks. Exemplary N-200 series carbon blacks may include N-220 (which a skilled person recognizes has an STSA value of 106 $m^2/g$), N-231 (which a skilled person recognizes has an STSA value of 107 $m^2/g$), N-294 and N-299 (which a skilled person recognizes has an STSA value of 97 $m^2/g$). Exemplary N-300 series carbon blacks may include N-326 (which a skilled person recognizes has an STSA value of 76 $m^2/g$), N-330 (which a skilled person recognizes has an STSA value of 75 $m^2/g$), N-335 (which a skilled person recognizes has an STSA value of 85 $m^2/g$), N-343 (which a skilled person recognizes has an STSA value of 92 $m^2/g$), N-347 (which a skilled person recognizes has an STSA value of 83 $m^2/g$), N-351 (which a skilled person recognizes has an STSA value of 70 $m^2/g$), N-356 (which a skilled person recognizes has an STSA value of 87 $m^2/g$), N-358 (which a skilled person recognizes has an STSA value of 78 $m^2/g$), and N-375 (which a skilled person recognizes has an STSA value of 91 $m^2/g$).

In one or more embodiments, the second carbon black may be defined by an iodine absorption number that is less than 60 g/kg, in other embodiments less than 55 g/kg, in other embodiments greater than 40 g/kg, and in other embodiments less than 30 g/kg, as determined according to ASTM D1510. In these or other embodiments, the second carbon black may be defined by an iodine absorption number that is greater than 8 g/kg, in other embodiments greater than 10 g/kg, and in other embodiments greater than 20 g/kg, as determined according to ASTM D1510. The second carbon black may also be characterized by a dibutylphthalate absorption number that varies over a wide range. For example, the dibutylphthalate absorption number may be as low as 34 $^{cc}/100$ g and increase up to numbers such as 180 $^{cc}/100$ g. In certain embodiments, the dibutylphthalate absorption number for the second carbon black may be less than 115 $^{cc}/100$ g, and in other embodiments less than 100 $^{cc}/100$ g.

In one or more embodiments, the second carbon black may be characterized as an N-400 series or higher carbon black according to ASTM D1765. These carbon blacks may include those selected from the group consisting of N-400 series, N-500 series, N-600 series, N-700 series, N-800 series, and N-900 series carbon blacks. Exemplary N-500 series carbon blacks include N-539 (which a skilled person recognizes has an STSA value of 38 m²/g), N-550 (which a skilled person recognizes has an STSA value of 39 m²/g), and N-582 carbon blacks. Exemplary N-600 series carbon blacks may include N-630 (which a skilled person recognizes has an STSA value of 32 m²/g), N-642, N-650 (which a skilled person recognizes has an STSA value of 35 m²/g), N-660 (which a skilled person recognizes has an STSA value of 34 m²/g), and N-683 (which a skilled person recognizes has an STSA value of 34 m²/g). Exemplary N-700 series carbon blacks may include N-754 (which a skilled person recognizes has an STSA value of 24 m²/g), N-762 (which a skilled person recognizes has an STSA value of 28 m²/g), N-765 (which a skilled person recognizes has an STSA value of 32 m²/g), N-772 (which a skilled person recognizes has an STSA value of 30 m²/g), N-774 (which a skilled person recognizes has an STSA value of 29 m²/g), and N-787 (which a skilled person recognizes has an STSA value of 32 m²/g). Exemplary N-900 series carbon blacks may include N-907 (which a skilled person recognizes has an STSA value of 9 m²/g), N-908 (which a skilled person recognizes has an STSA value of 9 m²/g), N-990 (which a skilled person recognizes has an STSA value of 8 m²/g), and N-991 (which a skilled person recognizes has an STSA value of 8 m²/g).

In one or more embodiments, the iodine absorption number (as determined according to ASTM D1510, of said first carbon black and the iodine absorption number of said second carbon black differ by at least 25 g/kg, in other embodiments by at least 50 g/kg and in other embodiments by at least 75 g/kg.

The carbon black filler component of the vulcanizates (e.g., treads) of the present invention may include a major amount of the first carbon black (i.e., the medium structure black). In one or more embodiments, the carbon black filler component includes greater than 50% by weight of the first carbon black, in other embodiments greater than 60% by weight of the first carbon black, and in other embodiments greater than 75% by weight of the first carbon black based on the total weight of the carbon black component. In these or other embodiments, the carbon black component includes less than about 99% by weight, in other embodiments less than about 95% by weight, and in other embodiments less than 90% by weight of the first carbon black based upon the total weight of the carbon black component.

With respect to the second carbon black (i.e., the low structure black), the carbon black filler component of the vulcanizates may include a minor amount of the second carbon black. In one or more embodiments, the carbon black filler component includes less than 50% by weight of the second carbon black, in other embodiments less than 40% by weight of the second carbon black, and in other embodiments less than 25% by weight of the second carbon black based on the total weight of the carbon black component. In these or other embodiments, the carbon black component includes greater than about 1% by weight, in other embodiments greater than about 5% by weight, and in other embodiments greater than 10% by weight of the second carbon black based upon the total weight of the carbon black component.

With respect to the carbon black filler component as a whole, the vulcanizates of one or more embodiments of the present invention may include from about 1 to about 100 parts by weight carbon black per 100 parts by weight rubber, in other embodiments from about 10 to about 85 parts by weight carbon black per 100 parts by weight rubber, and in other embodiments from about 20 to about 80 parts by weight carbon black per 100 parts by weight rubber.

The tire components or vulcanizates may be prepared from rubber mixtures (also known as vulcanizable rubber compositions) that include a rubber component, a filler component, a curative system, and other ingredients that are conventionally employed in the preparation of tire components and/or vulcanizates. The rubber component may include both functionalized and non-functionalized polymers. In one or more embodiments, the rubber component includes at least 5%, in other embodiments at least 10%, in other embodiments at least 20%, in other embodiments at least 40%, and in other embodiments at least 60% by weight functionalized polymer based on the total weight of the rubber component. In these or other embodiments, the rubber component includes at least 1%, in other embodiments at least 5%, in other embodiments at least 10%, and in other embodiments at least 50% non-functionalized polymer based on the total weight of the rubber component.

The rubber component may include both functionalized polymers and unfunctionalized polymers. In other words, the vulcanizates may be prepared by vulcanizing both unsaturated functionalized polymers and unsaturated non-functionalized polymers. The non-functionalized unsaturated polymers, which may also be referred to as elastomers or rubbery elastomers, may include natural and synthetic elastomers. The synthetic elastomers may derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Exemplary rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped.

As discussed above, the filler component includes a carbon black filler component, which itself includes a first carbon black and a second carbon black as discussed above. The filler component may also include other fillers including those conventionally employed in the preparation of tire components and/or vulcanizates. These fillers may include inorganic and organic fillers. The organic fillers include carbon black (including those not classified as medium or low structure blacks as defined herein) and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 *Kirk-Othmer, Encyclopedia of Chemical Technology*, 365-468, ($39^{rd}$ Ed. 1982), particularly *Vulcanization Agents and Auxiliary Materials*, 390-402, and A. Y. Coran, *Vulcanization in Encyclopedia of Polymer Science and Engineering*, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

In one or more embodiments, the preparation of vulcanizable compositions and the construction and curing of the tire is not affected by the practice of this invention. In one or more embodiments, the rubber mixture may be prepared by forming an initial masterbatch that includes the rubber component and filler. The initial masterbatch may include the functional polymer, the medium structure black, and the low structure black. In other embodiments, one or more of the functionalized polymer, the medium structure black, and the low structure black may be added in subsequent mixing stages. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized polymer, medium structure black, or low structure black can be added during these remills. Rubber compounding techniques and the additives employed therein are generally known as disclosed in Stephens, *The Compounding and Vulcanization of Rubber*, in *Rubber Technology* ($2^{nd}$ Ed. 1973).

Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172, 5,696,197, 6,608,145, 6,667,362, 6,579,949, 6,590,017, 6,525,118, 6,342,552, and 6,683,135, which are incorporated herein by reference.

These vulcanizable rubber compositions, which may also be referred to as stocks, are useful for forming tire components such as treads, subtreads, black sidewalls, body ply skins, bead filler, and the like. Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In one or more embodiments, tire treads can be prepared that exhibit both advantageous dynamic storage modulus and advantageous tan δ (i.e., hysteresis loss) at 50° C. In certain embodiments, the present invention provides tire treads characterized by a dynamic storage modulus (G') of at least 1 MPa, in other embodiments at least 1.5 MPa, and in other embodiments at least 2 MPa, while maintaining a tan δ of less than 0.3, in other embodiments less than 0.25, and in other embodiments less than 0.2, as determined at 50° C. by employing a Rheometrics Dynamic Analyzer at a frequency of 1.0 Hz for a strain sweep from 1 to 10% strain. For purposes of this specification, 50° C. hysteresis loss refers to tan δ at these conditions. Accordingly, one or more embodiments of the present invention include a method for increasing the dynamic storage modulus of tire treads while minimizing any increase in hysteresis loss.

In order to demonstrate the practice of the present invention, the following examples have been prepared and tested. The examples should not, however, be viewed as limiting the scope of the invention. The claims will serve to define the invention.

EXAMPLES

Samples 1-5

Five rubber compositions were mixed, prepared into green rubber samples, cured into vulcanizates, and tested for various mechanical and dynamic properties. The recipe for the rubber formulation for each sample is set forth in Table I, which provides the various ingredients in parts by weight.

TABLE I

| Samples | 1 | 2 | 3 | 4 | 5 |
|---|---|---|---|---|---|
| Functionalized Polymer and Oil | 80.5 | 80.5 | 80.5 | 80.5 | 80.5 |
| Natural Rubber | 30 | 30 | 30 | 30 | 30 |
| Carbon Black |  |  |  |  |  |
| Medium Sized Carbon Black (N343) | 41 | 46 | 51 | 41 | 41 |
| Large Sized Carbon Black (N660) | 0 | 0 | 0 | 5 | 10 |
| Antiozonant | 0.95 | 0.95 | 0.95 | 0.95 | 0.95 |
| Zinc Oxide | 2.5 | 2.5 | 2.5 | 2.5 | 2.5 |
| Stearic Acid | 2 | 2 | 2 | 2 | 2 |
| Wax | 1 | 1 | 1 | 1 | 1 |
| Sulfur | 1.3 | 1.3 | 1.3 | 1.3 | 1.3 |
| Accelerators | 1.9 | 1.9 | 1.9 | 1.9 | 1.9 |

The functionalized polymer was a di-functionalized polymer (i.e., head and tail functionalized polymer) that was prepared by employing a tributyl tin lithium initiator and was terminated and/or coupled with tin tetrachloride and tributyl tin chloride. The polymer was a random styrene-butadiene copolymer including about 35% styrene and about 18% vinyl content and was characterized by a weight average molecular weight of about 295 kg/mole and a number average molecular weight of about 235 kg/mole. The functionalized polymer was oil extended with 15 parts by weight oil per 100 parts by weight rubber.

The medium structure carbon black was an N-343 carbon black, which was characterized by an iodine absorption number (per ASTM D1510) of 92 g/kg and a dibutylphthalate absorption number (per ASTM D2414) of 130 cc/100 g. The low structure carbon black was an N-660 carbon black, which was characterized by an iodine absorption number per ASTM D1510 of 36 g/kg and a dibutylphthalate absorption number per ASTM D2414 of 90 cc/100 g. The accelerators included a blend of diphenylguanadine and N-cyclohexyl-2-benzothiazolesulfenamide accelerators.

Each rubber composition was prepared in three mixing segments. A 300 g Brabender mixer was used for the mixing. The first mix, which may be referred to as the masterbatch, employed a mixer speed of 60 r.p.m. with an initial temperature of 130° C. A total mixing time of 6 minutes was used, and the drop temperature ranged from about 170° C. to about 176° C. Immediately following the masterbatch, the mixture was transferred to a two-roll mill operating at a temperature of about 60° C., where the composition was sheeted and subsequently cooled to room temperature. The masterbatch stock was then further mixed in a remill stage using similar conditions to those employed in the masterbatch. Immediately following the remill, the mixture was transferred to a two-roll mill operating at 60° C., where the composition was sheeted and subsequently cooled to room temperature. The composition was then transferred back to the Brabender mixer and the final-batch ingredients (e.g., curatives) were added. The initial mixer temperature was 70° C., and the mixing speed was about 40 r.p.m. The composition was removed from the mixer after 2.5 minutes, and the temperature of the composition was about 100° C. This composition was then milled and sheeted using a two-roll mill at 60° C. The composition was fabricated into green test samples including cylindrical buttons (0.79 cm×1.5 cm), sheets (15.24 cm×15.24 cm×0.19 cm or 15.24 cm×15.24 cm×0.52 cm), and donut-shaped Lambourn wear specimens (outer=4.85 cm, inner=2.25 cm, thickness=0.49 cm). The green samples were then cured at 171° C. for 15 minutes in standard molds placed in a hot press.

Table II sets forth the data obtained from various mechanical and dynamic tests performed on the various samples.

sured using a Monsanto Rheometer MD2000, at a frequency of 1.67 Hz, 160° C., and a strain of 7%. MH and ML are the measured maximum and minimum torques, respectively. TS2 is the time required for the torque to reach 2% of the total torque increase during the curing process. T90 is the time required for the torque to reach 90% of the total torque increase during the curing process. Likewise, T10 is the time required for the torque to reach 10% of the total torque increase during the curing process.

The Zwick Rebound Test is a dynamic test that measures rebound resilience. Rebound resilience is typically defined as the ratio of mechanical energies before and after impact. Samples were tested according to ASTM D1054-91 (2000). Sample specimens were milled and cured according to ASTM D1054, using the mold specified. The cured sample was coated with talc and conditioned in an oven for about one hour

TABLE II

| Sample | 1 | 2 | 3 | 4 | 5 |
|---|---|---|---|---|---|
| $ML_{1+4}$ @ 130° C.: | 44.1 | 52.2 | 62.5 | 47.2 | 53.5 |
| 50% Modulus @ 23° C. (MPa): | 0.98 | 1.10 | 1.78 | 1.05 | 1.13 |
| 300% Modulus @ 23° C. (MPa): | 9.66 | 11.30 | 18.60 | 10.60 | 11.81 |
| Tensile Break Stress @ 23° C. (MPa): | 21 | 19.3 | 27.9 | 18.6 | 18.5 |
| Elongation at Break @ 23° C. (%): | 488 | 427 | 398 | 437 | 412 |
| 50% Modulus @ 100° C. (MPa): | 0.8 | 0.85 | 1.39 | 0.87 | 0.94 |
| 200% Modulus @ 100° C. (MPa): | 3.96 | 4.51 | 7.61 | 4.48 | 5.10 |
| Tensile Break Stress @ 100° C. (MPa): | 8.25 | 8.21 | 10.48 | 7.13 | 7.73 |
| Elongation at Break @ 100° C. (%): | 307 | 285 | 242 | 265 | 258 |
| Ring Tear, Tear Strength @ 171° C. (kN/m): | 13.1 | 13.9 | 13.5 | 14.2 | 14.2 |
| Ring Tear, Travel at Tear @ 171° C. (%): | 265 | 257 | 228 | 260 | 242 |
| Lambourn Wear Index [65% slip]: | 100 | 92 | 88 | 91 | 85 |
| Pendulum Rebound @ 23° C.: | 55.2 | 52.0 | 48.8 | 54.0 | 52.8 |
| Pendulum Rebound @ 50° C.: | 68.8 | 65.6 | 62.8 | 67.8 | 66.2 |
| TEMPERATURE SWEEP | | | | | |
| tan δ [torsion strip; 50° C.; 5 Hz, 2% strain]: | 0.108 | 0.128 | 0.154 | 0.123 | 0.126 |
| G' (MPa) [torsion strip; 50° C.; 5 Hz, 2% strain]: | 2.65 | 3.42 | 3.93 | 2.93 | 3.89 |
| STRAIN SWEEP | | | | | |
| ΔG' (MPa) [torsion button; 50° C.; 1 Hz, 0.03%-14%]: | 0.47 | 0.69 | 0.93 | 0.56 | 0.68 |
| G' (MPa) [torsion button; 50° C.; 1 Hz, 5%]: | 1.62 | 1.87 | 2.18 | 1.80 | 2.08 |
| tanδ [torsion button; 50° C.; 1 Hz, 5%]: | 0.098 | 0.111 | 0.122 | 0.100 | 0.105 |

As can be seen from the FIGURE, the line drawn between data points for the samples of the present invention is steeper than that of the comparative samples. This indicates that practice of the present invention allows for increased G' by higher carbon black loading with less deleterious impact on tan δ.

Tensile mechanical properties were measured using ASTM-D 412 at 25° C. Tear mechanical properties were measured using ASTM-D 624 at 171° C. Dynamic properties were determined by using a Rheometrics Dynamic Analyzer (RDA). Tan δ was obtained from temperature sweep experiments conducted with a frequency of 31.4 rad/sec using 0.5% strain for temperatures ranging from −100° C. to −10° C., and with 2% strain for temperatures ranging from −10° C. to 100° C. Strain sweep experiments on an RPA 2000 Rubber Process Analyzer (Alpha Technologies) were used to obtain ΔG' data, at a frequency of 1.0 Hz (3.14 rad/sec) and a temperature of 50° C., with strain sweeping from 0.25% to 1000%.

The green stock Mooney viscosity measurements were taken at 130° C. The sample was preheated for 1 minute, a large rotor was started, and the torque was measured after 4 minutes of rotation. Mooney scorch measurements, specifically the time required for an increase of 5 Mooney units (T5) can indicate how fast the compound viscosity will increase during extrusion processes. Curing characteristics were meaat the recommended temperature. The conditioned sample was placed into a Zwick type rebound tester, a pendulum was swung against the sample, and the angle at which the pendulum bounced back was measured. Percent rebound is calculated according to the equation specified in ASTM D1054.

Various modifications and alterations that do not depart from the scope and spirit of this invention will become apparent to those skilled in the art. This invention is not to be duly limited to the illustrative embodiments set forth herein.

What is claimed is:

1. A tire component comprising:

a rubber vulcanizate including one or more functional groups, where said one or more functional groups reduce the 50° C. hysteresis loss of the vulcanizate when compared to similar vulcanizates without the functional group; and a carbon black filler, where said carbon black filler includes (i) a first plurality of carbon black particles characterized by a statistical thickness surface area (STSA) value that is greater than 70 m²/g and (ii) a second plurality of carbon black particles characterized by a statistical thickness surface area (STSA) value that is less than 39 m²/g.

2. The tire component of claim 1, where the one or more functional groups reduce the 50° C. hysteresis loss by at least 5% when compared to similar vulcanizates without the functional group.

3. The tire component of claim 2, where the one or more functional groups reduce the 50° C. hysteresis loss by at least 10% when compared to similar vulcanizates without the functional group.

4. The tire component of claim 1, where said functional group includes a heteroatom.

5. The tire component of claim 4, where said functional group includes a tin-containing, a nitrogen-containing, a carbonyl-containing, a boron-containing, a phosphorous-containing, sulfur-containing, or oxygen-containing group.

6. The tire component of claim 5, where tire component is a tire tread.

7. The tire component of claim 1, where the tire includes from about 1 to about 100 parts by weight carbon black per 100 parts by weight rubber.

8. The tire component of claim 1, where said vulcanizate is formed by vulcanizing a rubber mixture, where the rubber mixture includes an unsaturated polymer bearing said one or more functional groups and optionally unsaturated polymer without a functional group.

9. The tire component of claim 8, where the carbon black includes at least 60 parts by weight of said first carbon black and less than 40 parts by weight of said second carbon black, based upon the total weight of the carbon black filler.

10. The tire component of claim 1, where said vulcanizate includes a cured polymer of butadiene and optionally comonomers.

11. The tire component of claim 8, where the carbon black includes greater than 50 percent by weight of said first carbon black, with the balance including said second carbon black.

* * * * *